United States Patent [19]

Momiyama

[11] 4,253,736
[45] Mar. 3, 1981

[54] COMBINATION LENS SYSTEM WITH ATTACHMENT LENS

[75] Inventor: Kikuo Momiyama, Yokohama, Japan

[73] Assignee: Canon Kabushiki Kaisha, Tokyo, Japan

[21] Appl. No.: 940,184

[22] Filed: Sep. 7, 1978

Related U.S. Application Data

[63] Continuation of Ser. No. 743,067, Nov. 18, 1976, abandoned.

[30] Foreign Application Priority Data

Nov. 19, 1975 [JP] Japan ................... 50-138995

[51] Int. Cl.$^3$ .................. G02B 15/12; G02B 13/02
[52] U.S. Cl. .................. 350/422; 350/463; 350/464
[58] Field of Search .................. 350/214, 215, 183

[56] References Cited

U.S. PATENT DOCUMENTS

| | | | |
|---|---|---|---|
| 3,388,650 | 1/1968 | Westphalen | 350/183 |
| 3,854,797 | 12/1974 | Yokota | 350/214 |

*Primary Examiner*—Conrad J. Clark
*Attorney, Agent, or Firm*—Toren, McGeady and Stanger

[57] ABSTRACT

A combination lens system including a camera objective and a rear attachment therefor. The objective is preferably of the telephoto type comprising a front group having a positive focal length and a rear group having a negative focal length. The rear group is axially movable in whole or in part to increase the back focal length of the telephoto objective. The attachment lens has a negative focal length and consists of a plurality of lens elements. The axial separation between the front group and the attachment lens is maintained constant during the time when the rear lens group or sub-group thereof is moved to control the adjustment of the back focal distance.

7 Claims, 20 Drawing Figures

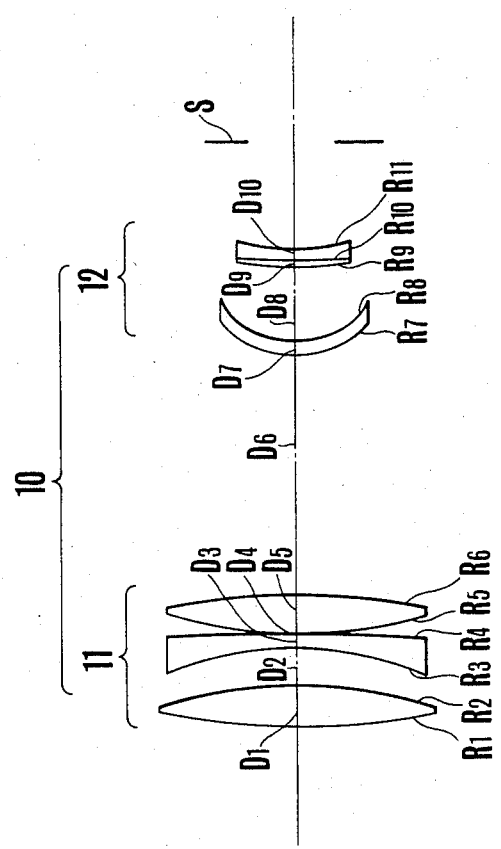

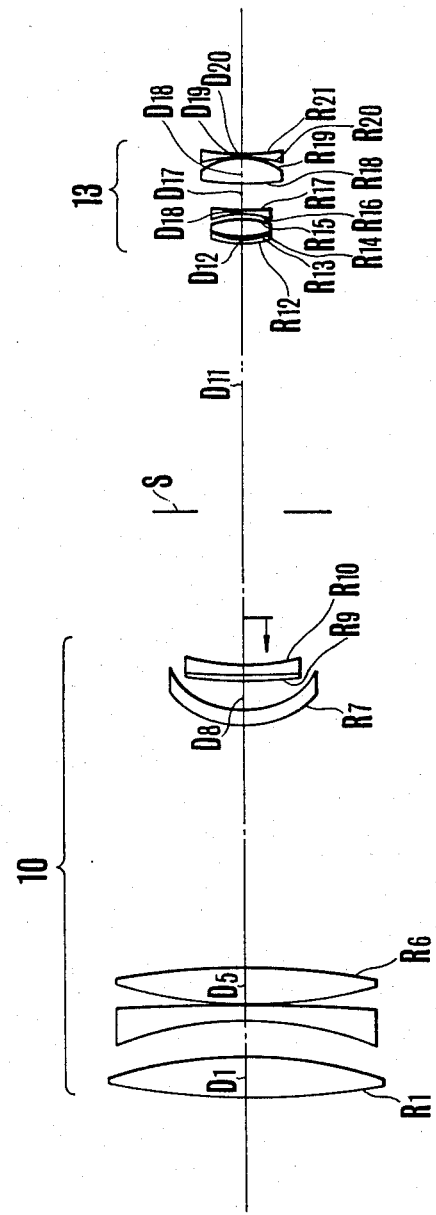

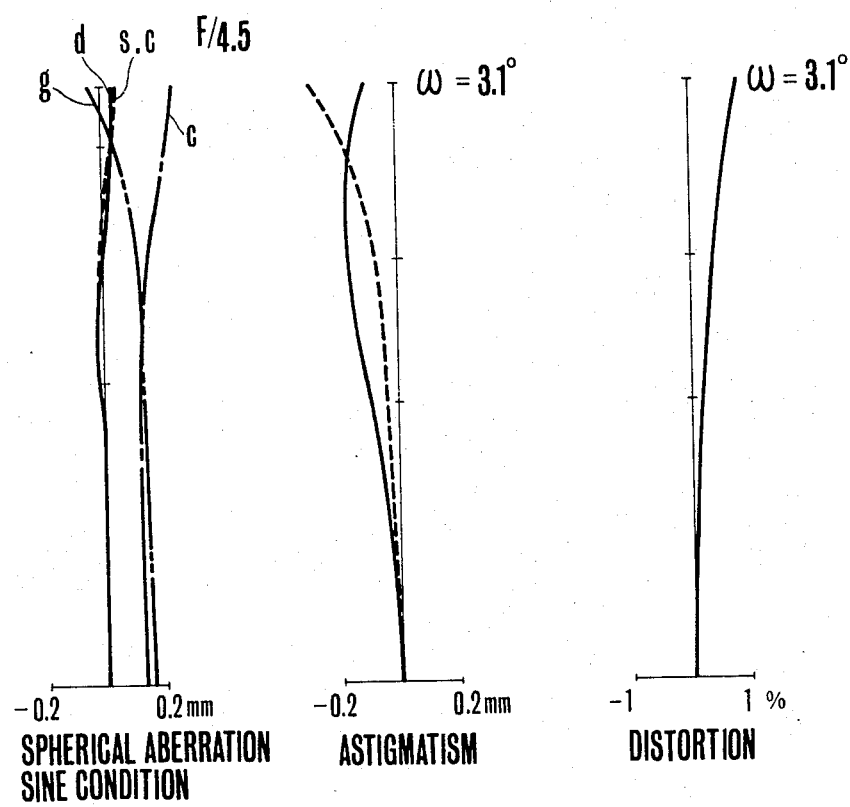

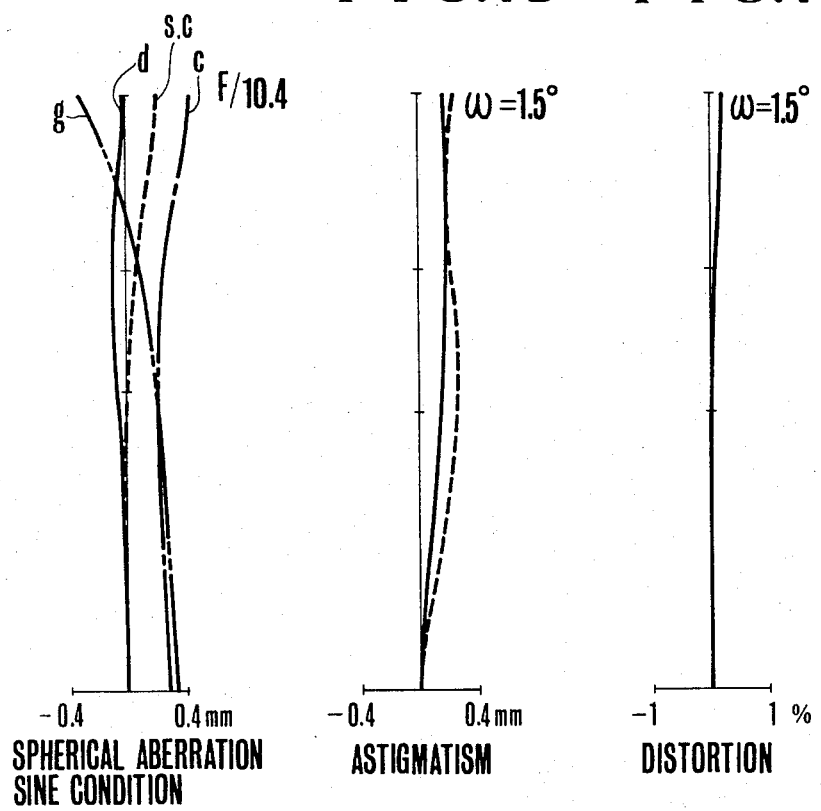

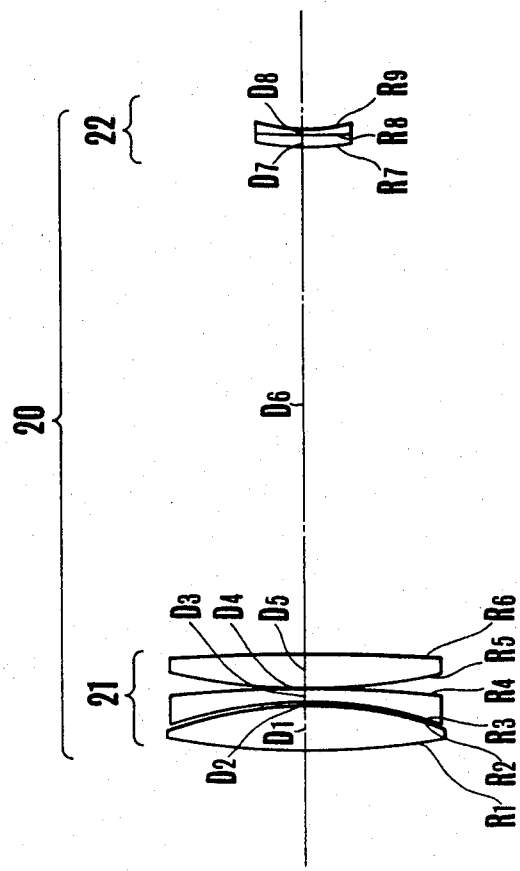

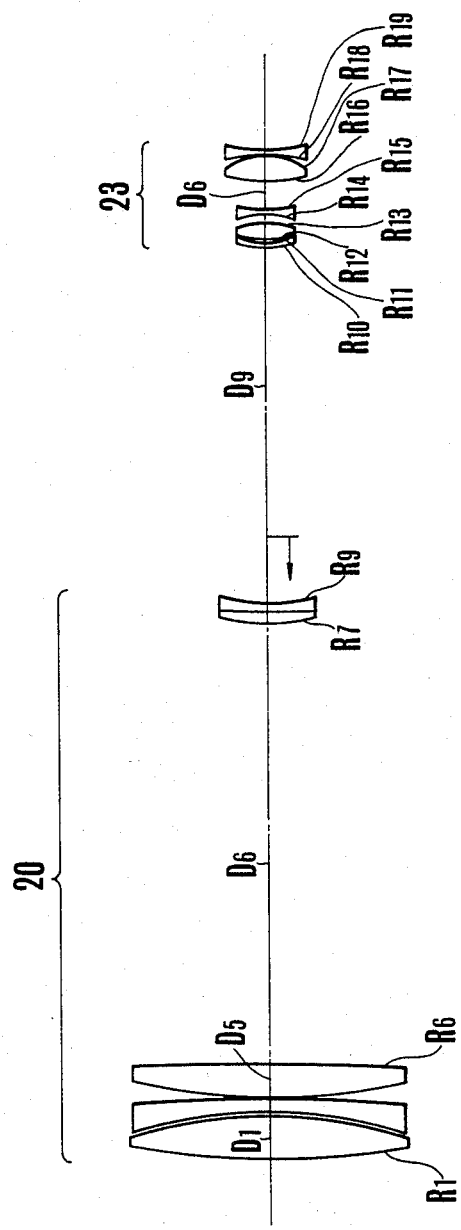

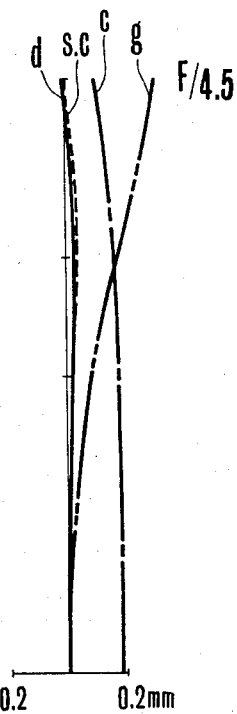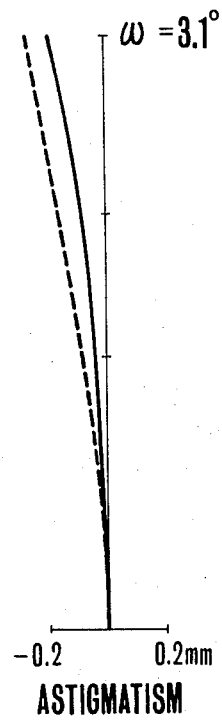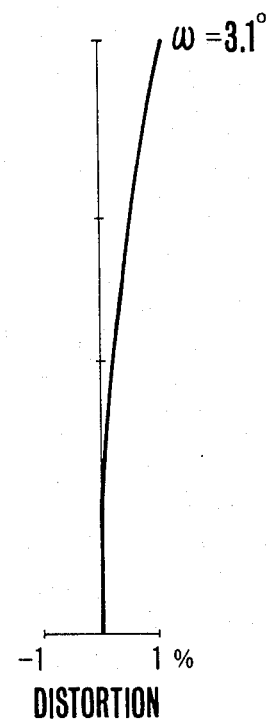

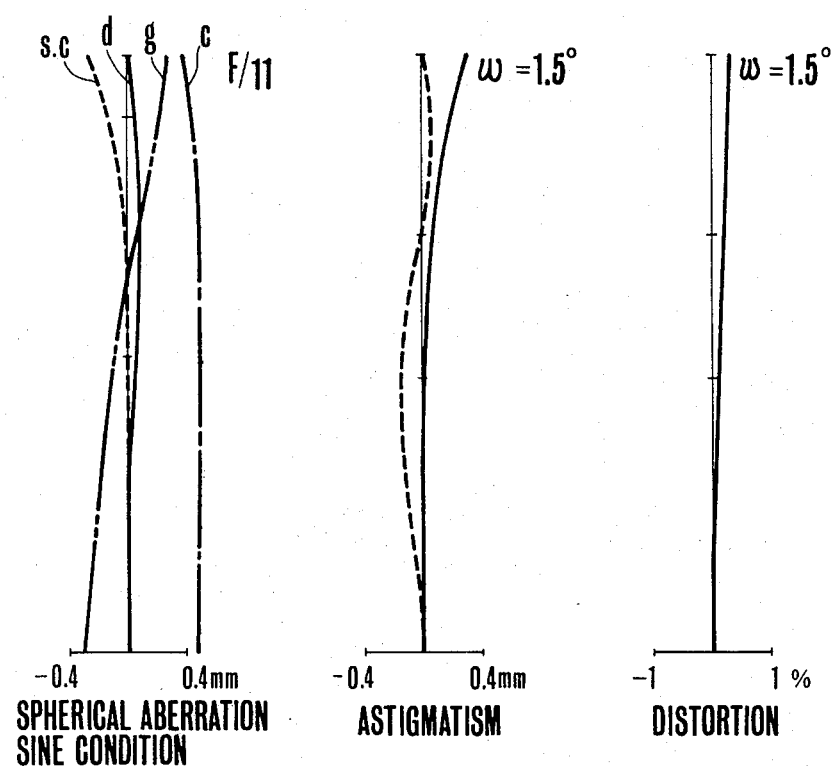

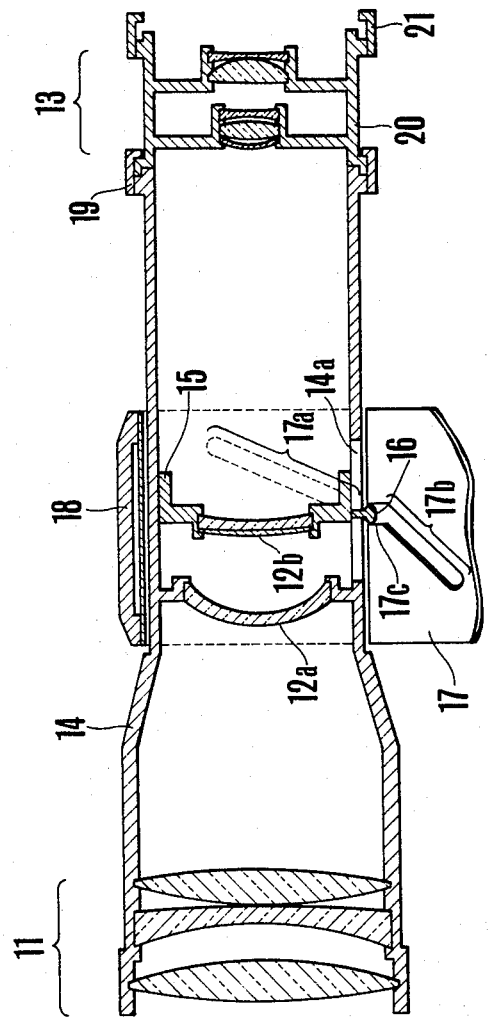

COMBINATION LENS SYSTEM WITH ATTACHMENT LENS

This is a continuation of application Ser. No. 743,067, filed Nov. 18, 1976 now abandoned.

BACKGROUND OF THE INVENTION

This invention relates to a combination lens system including a basic objective and a rear attachment capable of varying the focal length of the basic objective, and more particularly to an attachment lens having a decreased refractive power to improve image aberrations and particularly field curvature.

It is known to provide a front or rear attachment lens for camera objectives of fixed focal length to increase or decrease the focal length of the objective. The front attachment lens has, however, a disadvantage of requiring a large size. The rear attachment though having an advantage of requiring a smaller size than that of the front attachment has the inherent difficulty that it is hard to achieve good aberration correction and particularly field curvature. The presently available attachments of the latter type are generally characterized by the lack of sufficient lens performance.

A method of improving the above mentioned defect of the attachment lens for Gauss type objectives has been proposed by the present applicant in Japanese Patent Application No. Sho 47-30311 (Japanese Laid-Open Patent Application No. Sho 48-97528). According to this proposal, the attachment lens is divided into two major groups of elements, the front group having a negative refractive power and the rear group having a positive refractive power, so that the front principal point is shifted ahead. Each of the groups is composed of positive and negative lens elements of strong refractive power, the positive lens element being made from low refractive index glass and the negative lens element being made from high refractive index glass so that the Petzval sum is improved.

SUMMARY OF THE INVENTION

The present invention has for its object to provide a combination lens system having good image quality without particular requirements for an attachment lens thereof.

In the most preferable embodiment of the invention applied to a combination lens system of telephoto type including a basic objective and a rear attachment lens capable of increasing the focal length of the objective, the basic objective is of telephoto type having a front lens group of positive refractive power and a rear lens group of negative refractive power, and the rear group is axially moved in whole or in part toward the front to increase the back focal length of the complete basic objective with the image point shifted distant from the basic objective when the attachment lens of negative refractive power is combined with and at the rear of the basic objective. In the resultant combination lens system, as the axial separation between the front principal point of the attachment lens and the shifted image point of the basic objective on the image side of the front principal point of the attachment lens is increased with increase in the object distance for the attachment lens, the refractive power of the attachment lens is weakened, thereby it being made possible to improve the image aberrations.

BRIEF DESCRIPTION OF THE DRAWINGS

FIGS. 4 and 5 are block diagrams of one embodiment of a combination lens system according to the invention with the telephoto type basic objective being shown in FIG. 4 and the attachment lens combined with the objective being shown in FIG. 5.

FIGS. 6A, 6B and 6C are aberrational curves of the only telephoto type basic objective of FIG. 4 with object at infinity.

FIGS. 7A, 7B and 7C are aberrational curves of the lens system of FIG. 5 with object at infinity.

FIGS. 8 and 9 are block diagrams of another embodiment of a combination lens system according to the invention with the telephoto type basic objective being shown in FIG. 8 and the attachment lens combined with the objective being shown in FIG. 9.

FIGS. 10A, 10B and 10C are aberrational curves of the only telephoto type basic objective of FIG. 8 with object at infinity.

FIGS. 11A, 11B and 11C are aberrational curves of the combination lens system of FIG. 9 with object at infinity.

FIG. 12 is a longitudinal sectional view of a mechanical mounting for the combination lens system of FIGS. 8 and 9 having a cam sleeve shown partly in elevational.

DETAILED DESCRIPTION OF THE PREFERRED EMBODIMENTS

Figure 1:
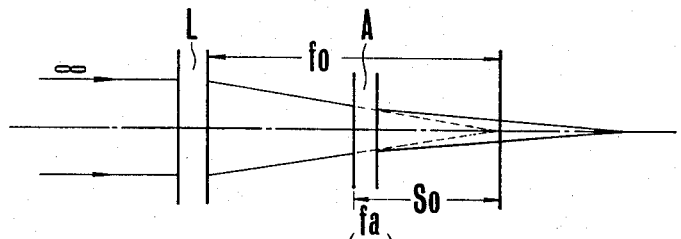
FIGS. 1, 2 and 3 are diagrams of geometry considered in explaining the principles of the invention.

In FIG. 1, a basic objective L is indicated by its two principal planes, and an attachment lens for the objective L is indicated at A. When the attachment lens A is located in rear of the camera objective L, the magnification $\beta a$ of the attachment lens A may be expressed by the following formula $$\beta a = fa/(fa + So)$$

wherein fa is the focal length of the attachment lens A, and So is the axial separation between the front principal point of the attachment lens A and the focal point of the basic objective L. For the combination lens system comprising the basic objective L and the rear attachment lens A, we have its overall focal length F expressed by the following formula $$F = fo \times \beta a = fo \times \frac{fa}{fa + So}$$

wherein fo is the focal length of the basic objective L. The focal length of the attachment lens A can, therefore, be determined by the formula $fa = So \times \beta a(1 - \beta a)$. Because of $\beta a > 1$ and $So > 0$, then $fa < 0$. When the magnification $\beta a$ of the attachment lens A is given, the focal length fa of the attachment lens A is rendered dependent upon only one variable So.

In order to facilitate aberration correction by decreasing the refractive power of the attachment lens A, it is required to increase the axial separation So between the front principal point of the attachment lens and the focal point of the basic objective. According to the prior art, however, increasing axial separation So will result in mechanical interference between the rear vertex of the camera objective and the front vertex of the attachment lens. Accordingly, So has not been made particularly large. This leads to the design of the attachment lens having a small focal length of negative sign, that is, a negative large refractive power, so that the Petzval sum of the entire lens system is increased in the negative sense, thereby it being made difficult to achieve good correction of field curvature which constitutes the most serious aberrational problem of the rear attachment lens-employing combination lens system.

Figure 2:
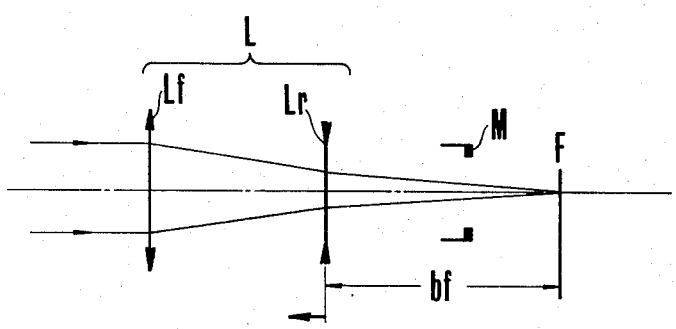
Figure 3:
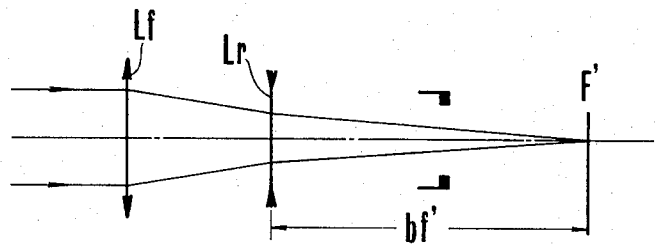

According to the present invention as applied, for example to a telephoto type camera objective comprising a front lens group Lf of positive power and a rear lens group Lr of negative power, the rear lens group Lr is made axially movable in whole or in part toward the front as shown in FIGS. 2 and 3. It is to be noted that if the movable part of the rear lens group is of positive power, rearward movement must be imparted thereto. As the rear group Lr is moved forward from the position of FIG. 2 to that of FIG. 3, the back focal length bf of the basic objective L is increased to bf'. At this time, the focal point F of the basic objective is shifted toward the rear until F' with the resultant axial separation between the fixturing mechanism of the mounting for the basic objective L and the image plane being increased to as large an extent as to accommodate the attachment lens A therein, thereby giving an additional advantage of improving aberration correction as the refractive power of the attachment lens may be decreased.

Two preferred embodiments of the combination lens system according to the present invention are shown in FIGS. 4 and 5, and FIGS. 8 and 9 respectively. In FIG. 4, the basic objective of the telephoto type 10 comprises a front group 11 of elements and a rear group 12 of elements with a diaphragm being indicated at S. The rear lens group 12 comprises a stationary negative singlet with the surfaces R7 and R8 and a movable negative doublet with the front and rear surfaces R9 and R11. FIG. 5 shows the combination of the objective of FIG. 4 with the rear attachment lens 13 in which the negative doublet of the objective 10 is shifted forward. FIG. 8 shows another telephoto type objective 20 comprising a front group 21 and a rear group 22. The rear group 22 consists of only one lens member in the form of a negative doublet with the front and rear surfaces R7 and R9, and is axially movable in whole. FIG. 9 shows the combination of the objective of FIG. 8 with an attachment lens 23 in which the negative doublet (R7, R9) is shifted toward the front.

Numerical data for the above mentioned first or FIGS. 4 and 5 and second or FIGS. 8 and 9 embodiments of the invention are given in the following tables for the radii of curvature, R, the axial separations between the successive refracting surfaces, D, the refractive indices, Nd, for the spectral D line of sodium, and the Abbe numbers, V, for the various lens elements. The minus values of the radii, R, indicate surfaces concave toward incident light.

EMBODIMENT I

TABLE 1

Basic Objective:
Focal length f = 400 mm F-number = 4.5 2ω = 6.20°

| Surface No. | R | D | Nd | V |
|---|---|---|---|---|
| 1 | 224.62 | | | |
| | | 14.2 | 1.43387 | 95.1 |
| 2 | −142.9 | | | |
| | | 12.48 | | |
| 3 | −117.79 | | | |
| | | 5. | 1.7859 | 44.1 |
| 4 | −909.15 | | | |
| | | 0.5 | | |

TABLE 1-continued

| 5 | 162.63 | | | |
|---|---|---|---|---|
| | | 12.2 | 1.48749 | 70.1 |
| 6 | −231.47 | | | |
| | | 80.73 | | |
| 7 | 34.23 | | | |
| | | 5. | 1.58913 | 61.1 |
| 8 | 31.03 | | | |
| | | *25. | | |
| 9 | 147.8 | | | |
| | | 2.2 | 1.76182 | 26.6 |
| 10 | 399.96 | | | |
| | | 3.3 | 1.713 | 53.9 |
| 11 | 76.94 | | | |

Attachment lens:

| Surface No. | R | D | Nd | V |
|---|---|---|---|---|
| 12 | 36.41 | | | |
| | | 1. | 1.713 | 53.9 |
| 13 | 18.69 | | | |
| | | 1.3 | | |
| 14 | 34.68 | | | |
| | | 5.55 | 1.5927 | 35.3 |
| 15 | −31.67 | | | |
| | | 1.82 | | |
| 16 | −28.63 | | | |
| | | 1. | 1.7859 | 44.1 |
| 17 | 81.63 | | | |
| | | 9.09 | | |
| 18 | 115.07 | | | |
| | | 8.7 | 1.50137 | 5.4 |
| 19 | −22.67 | | | |
| | | 0.15 | | |
| 20 | −58.78 | | | |
| | | 1.2 | 1.72342 | 38.0 |
| 21 | 173.41 | | | |

Combination lens system:
f = 800 mm F-number = 10.4 2ω = 3.1°

| D8 | D11 |
|---|---|
| 10 | 90.58 |

EMBODIMENT II

TABLE 2

Basic objective: f = 400 mm F-number = 4.5 2ω = 6.2°

| Surface No. | R | D | Nd | V |
|---|---|---|---|---|
| 1 | 269.35 | | | |
| | | 15. | 1.43387 | 95.1 |
| 2 | −165.16 | | | |
| | | 0.57 | | |
| 3 | −175.34 | | | |
| | | 5. | 1.8061 | 40.9 |
| 4 | −582.43 | | | |
| | | 0.5 | | |
| 5 | 221.05 | | | |
| | | 11. | 1.48749 | 70.1 |
| 6 | −1181.46 | | | |
| | | *170.66 | | |
| 7 | 78.47 | | | |
| | | 4. | 1.70154 | 41.1 |
| 8 | 612.19 | | | |
| | | 2.5 | 1.713 | 53.9 |
| 9 | 54.91 | | | |

Attachment lens:

| 10 | 26.47 | | | |
|---|---|---|---|---|
| | | 1. | 1.713 | 53.9 |
| 11 | 17.37 | | | |
| | | 1.8 | | |
| 12 | 52.69 | | | |
| | | 5.55 | 1.5927 | 35.3 |
| 13 | −25.91 | | | |
| | | 3.04 | | |
| 14 | −25.18 | | | |
| | | 1. | 1.7859 | 44.1 |
| 15 | 86.21 | | | |
| | | 9.46 | | |
| 16 | 85.09 | | | |
| | | 8.7 | 1.50137 | 56.4 |

TABLE 2-continued

| | | | | | |
|---|---|---|---|---|---|
| 17 | −22.73 | | | | |
| | | 0.15 | | | |
| 18 | −56.57 | | | | |
| | | 1.2 | 1.72342 | 38.0 | |
| 19 | 109.91 | | | | |

Combination lens system:
f = 800 mm F-number = 11 2ω = 3.1°

| D6 | D9 |
|---|---|
| 138.2 | 119.6 |

Aberration coefficient of embodiments I and II are given respectively in Tables 3 and 4 below for spherical aberration I, coma II, astigmatism III, Petzval sum P and distortion V.

TABLE 3

Basic objective only:

| | I | II | III | P | V |
|---|---|---|---|---|---|
| 1 | 1.191 | −1.236 | 1.283 | 0.538 | −1.891 |
| 2 | 34.548 | −61.864 | 110.779 | 0.846 | −199.886 |
| 3 | −50.387 | 88.347 | −154.907 | −1.494 | 274.231 |
| 4 | −0.000 | 0.005 | −0.033 | 0.193 | −0.983 |
| 5 | 3.271 | −3.553 | 3.860 | 0.806 | −5.069 |
| 6 | 12.241 | −22.582 | 41.656 | 0.566 | −77.886 |
| 7 | 6.714 | −4.979 | 3.692 | 4.332 | −5.950 |
| 8 | −7.528 | 5.252 | −3.664 | −4.778 | 5.890 |
| 9 | −0.088 | 0.489 | −2.712 | 1.170 | 8.554 |
| 10 | 0.050 | −0.108 | 0.235 | −0.016 | −0.472 |
| 11 | 0.070 | 0.115 | 0.190 | −2.163 | −3.238 |
| Σ | 0.084 | −0.115 | 0.379 | 0.000 | −6.701 |

Basic objective + Attachment lens

| | I | II | III | P | V |
|---|---|---|---|---|---|
| 1 | 9.533 | −4.350 | 1.985 | 1.077 | −1.398 |
| 2 | 276.388 | −230.166 | 191.674 | 1.693 | −161.030 |
| 3 | −403.097 | 328.169 | −267.169 | −2.988 | 219.941 |
| 4 | −0.007 | 0.021 | −0.064 | 0.387 | −0.971 |
| 5 | 26.168 | −12.576 | 6.044 | 1.612 | −3.679 |
| 6 | 97.895 | −84.169 | 72.367 | 1.132 | −63.194 |
| 7 | 53.747 | −16.568 | 5.107 | 8.664 | −4.245 |
| 8 | −60.263 | 17.253 | −4.939 | −9.557 | 4.150 |
| 9 | −0.347 | 1.220 | −4.286 | 2.340 | 6.831 |
| 10 | 0.490 | −0.498 | 0.506 | −0.032 | −0.482 |
| 11 | 0.132 | 0.044 | 0.014 | −4.327 | −1.445 |
| 12 | −0.093 | −0.779 | −6.472 | 9.145 | 22.204 |
| 13 | −7.174 | −26.489 | −97.796 | −17.816 | −426.836 |
| 14 | 1.199 | 5.744 | 27.509 | 8.584 | 172.831 |
| 15 | 17.536 | 28.761 | 47.171 | 9.400 | 92.782 |
| 16 | −19.042 | −32.952 | −57.020 | −12.296 | −119.946 |
| 17 | −0.035 | −0.380 | −4.019 | −4.312 | −88.136 |
| 18 | 0.010 | 0.153 | 2.282 | 2.321 | 68.451 |
| 19 | 11.341 | 33.974 | 101.773 | 11.784 | 340.172 |
| 20 | −3.851 | −8.415 | −18.388 | −5.712 | −52.664 |
| 21 | 0.013 | −0.195 | 2.748 | −1.936 | −11.432 |
| Σ | 0.545 | −2.196 | −0.971 | −0.836 | −8.096 |

TABLE 4

Basic objective only:

| | I | II | III | P | V |
|---|---|---|---|---|---|
| 1 | 0.691 | −0.168 | 0.040 | 0.449 | −0.119 |
| 2 | 21.447 | −24.520 | 28.035 | 0.724 | −32.881 |
| 3 | −25.500 | 29.324 | −33.721 | −1.018 | 39.948 |
| 4 | 0.511 | −0.933 | 1.704 | 0.306 | −3.670 |
| 5 | 0.311 | −0.042 | 0.005 | 0.593 | −0.081 |
| 6 | 2.513 | −3.660 | 5.330 | 0.110 | −7.924 |
| 7 | −0.021 | −0.183 | −1.600 | 2.101 | 4.362 |
| 8 | −0.020 | 0.016 | −0.014 | 0.002 | 0.009 |
| 9 | 0.051 | 0.144 | 0.405 | −3.031 | −7.346 |
| Σ | −0.015 | −0.023 | 0.185 | 0.237 | −7.702 |

Basic objective + Attachment lens

| | I | II | III | P | V |
|---|---|---|---|---|---|
| 1 | 5.529 | −0.672 | 0.081 | 0.898 | −0.119 |
| 2 | 171.599 | −98.092 | 56.072 | 1.448 | −32.881 |

TABLE 4-continued

| | | | | | |
|---|---|---|---|---|---|
| 3 | −204.034 | 117.308 | −67.446 | −2.036 | 39.948 |
| 4 | 4.092 | −3.735 | 3.408 | 0.613 | −3.670 |
| 5 | 2.496 | −0.170 | 0.011 | 1.186 | −0.081 |
| 6 | 20.113 | −14.643 | 10.661 | 0.221 | −7.924 |
| 7 | −0.793 | −1.243 | −1.947 | 4.203 | 3.532 |
| 8 | −0.259 | 0.116 | −0.052 | 0.005 | 0.021 |
| 9 | −1.649 | −1.095 | −0.727 | −6.064 | −4.511 |
| 10 | −0.125 | −0.750 | −4.480 | 12.581 | 48.366 |
| 11 | −5.417 | 22.556 | −93.921 | −19.168 | −470.893 |
| 12 | 0.089 | 0.680 | 5.177 | 5.650 | 82.394 |
| 13 | 23.546 | 51.660 | 113.341 | 11.491 | 273.879 |
| 14 | −20.544 | −46.764 | −106.450 | −13.979 | −274.133 |
| 15 | −0.004 | −0.063 | −1.006 | −4.083 | −80.456 |
| 16 | 0.004 | 0.072 | 1.261 | 3.139 | 76.905 |
| 17 | 8.230 | 29.938 | 108.901 | 11.752 | 438.885 |
| 18 | −3.200 | −8.863 | −24.542 | −5.935 | −84.398 |
| 19 | 0.003 | −0.116 | 3.574 | −3.055 | −15.943 |
| Σ | −0.325 | 1.007 | 1.917 | −1.131 | −11.079 |

The graphic representations of spherical aberration, sine condition, astigmatism and distortion of the lenses of FIGS. 4, 5, 8 and 9 with object at infinity are shown in FIGS. 6, 7, 10 and 11 respectively, with the reference character A for the spherical aberration and sine condition and those B and C for astigmatism and distortion respectively.

Focusing of the above-described combination lens system may be carried out by moving the basic objective as a whole. When the basic objective is of telephoto type, however, the invented principles of the high speed focusing telephoto type objective disclosed in Japanese Patent Application Nos. Sho 49-46920 and Sho 49-104736 assigned to the assignee of the present invention can be advantageously applied to the combination lens system of the present invention, as will be explained below.

In the case of the high speed telephoto type objective similar to that shown in FIG. 4, a front lens group of positive power as 11 is followed by a rear lens group as 12 which includes a stationary negative lens as (R7, R8) and at least one movable lens of negative power as (R9, R11), these negative lenses being of forward convexity. The movable lens (R9, R10) is moved toward the rear to effect focusing down from infinitely distant object to close-up. In the case of the rear lens group as 22 including at least one movable negative lens as (R7, R9) as shown in FIG. 8, the negative lens (R7, R9) is constructed from at least one positive singlet and one negative singlet and fulfills the following requirements $$-0.9F < Fb < -0.4F$$
$$3.5 < \frac{(Rc + Rv)}{(Rc - Rv)} < 8$$
$$-0.05 < \frac{F}{Fp \cdot Vp} + \frac{F}{Fn \cdot Vn} < 0.05$$

wherein F is the focal length of the entire lens system with object at infinity, Fb is the focal length of the rear lens group, Rv is the radius of curvature of the strong convex surface in the rear lens group; Rc is the radius of curvature of the strong concave surface in the rear lens group; Fp and Vp are the focal length and Abbe number of the positive singlet of the rear group respectively; and Fn and Vn are the focal length of and Abbe number of the negative singlet of the rear group respectively;

thereby it being made possible to effect focusing down to shorter object distances by moving the negative lens toward the rear.

By employing the above mentioned high speed telephoto type objective as the basic objective of the present invention, it is made possible that the back focal length can be increased by moving the focusing negative lens group toward the front, and that, after combined with the attachment lens, the basic objective having the increased focal length can be focused down to shorter object distances by moving the same negative lens group toward the rear.

FIG. 12 shows an example of the focusing mechanism usuable with the high speed focusing telephoto type objective but adapted for use as the basic objective of the invention. The front lens group 11 and the stationary negative singlet 12a of the rear lens group 12 are mounted in a common lens barrel 14 in fixedly secured relation to each other. The movable doublet 12b is fixedly mounted on an inner sleeve 15 slidingly axially movable within the lens barrel 14 while being prevented from rotation about the optical axis thereof as a pin 16 radially extending from the inner sleeve 15 is engaged in a longitudinally elongated guide slot 14a. Positioned on the outer side of the lens barrel 14 and in alignment with the inner sleeve 15 is an outer sleeve 17 having a camming slot in three distinct sections 17a, 17b and 17c and fixedly connected to a further outer sleeve or focusing ring 18 which is rotatable about the optical axis while being presented from longitudinal movement relative to the lens barrel by means not shown. The first camming slot section 17a is adapted for focusing purposes without the attachment lens 13, while the second camming slot section 17b for focusing purposes with the attachment lens 13. The first and second camming slots sections 17a and 17b are interconnected by a third camming slot section 17c of a short length directed almost perpendicularly to the direction of the slot 14a so that upon adjustment of location of the cam follower pin 16 to this camming slot section 17c without the attachment lens 13, the focusing is effected for object at infinity. On the other hand, when the basic objective is combined with the attachment lens, focusing for object at infinity is effected by adjusting the ring 18 so that the cam follower pin 16 is located at the forward end of the second camming slot section 17b. The lens barrel 14 is provided with an adaptor 19 for coupling with a camera body not shown and also with the forward end of another lens barrel 20 for the attachment lens 13. This lens barrel 20 is also provided with an adaptor 21 for coupling with the camera body. In FIG. 12, the diaphragm and diaphragm drive mechanisms are omitted for the purpose of clarity.

With the combination lens system and focusing mechanism of FIG. 12, when the focusing ring 18 is turned clockwise as viewed from the rear, the movable lens 12b reaches a point where the cam follower pin 16 abuts the forward end of the second camming slot section 17b so that the combination lens system is focused for object at infinity. Next, the focusing ring 18 may be turned counter-clockwise to effect focusing down to shorter object distances.

It will be seen from the foregoing that the present invention provides a lens system comprising a basic objective and an attachment capable of providing for an increased focal length with the resultant lens system from that of the basic objective while preserving high grade imagery of the basic objective which would be otherwise deteriorated by combination with the attachment lens, as part of the lens elements of the basic objective is moved, or removed, or an additional lens element or element is or are inserted thereto, so that the image plane is shifted toward the rear to permit reduction in the refractive power of the attachment lens to effect equivalent increase in the focal length of the entire lens system.

The above mentioned preferred embodiments of the present invention employ telephoto type objectives as the basic objective for the following reasons. The telephoto type objectives have focal lengths within a range for which optimum correction of the various aberrations can be easily afforded. The range of movement of the back focal length control lens element can be increased to as large an extent as to accommodate the attachment lens, or otherwise the corresponding lens element or elements must be either removed or inserted to vary the back focal length with suffering from troublesome manipulation therefor.

Further, the present invention gives rise to a possibility of utilizing the back focal length control lens element or elements as the focusing one by taking into account the high speed focusing operation, thereby giving advantages such that the strain on the design of the attachment lens is reduced, that optimum correction can be afforded, and that the focusing mechanism can be simplified in structure.

What is claimed is:

1. A combination lens system comprising:
a telephotographic objective lens including a front lens group having a positive focal length, a rear lens group positioned axially closer to an image side than said front lens group, said rear lens group including at least one sub-group movable within an ordinary axial movement range for focusing of said telephotographic objective lens and a second movement range; and
an attachment lens including a plurality of lens elements and being removably situated on the image side of said telephotographic objective lens in axial alignment,
wherein said sub-group moves in said second movement range for focusing of a system formed by attaching said attachment lens to said telephotographic objective lens.

2. A combination lens according to claim 1, wherein said attachment lens group has a negative synthetic focal length, and the position which said sub-group takes within the ordinary movement range when said telephotographic objective lens is focused at infinity is adjacent to the position which the sub-group takes within the second movement range when the system formed by attaching said attachment lens to said telephotographic objective lens is focused on a near objective.

3. A combination lens system according to claim 2, wherein said sub-group has a negative focal length and is moved toward the front when said telephoto lens is combined with said attachment lens.

4. A combination lens system according to claim 2, wherein said sub-group is said rear lens group and is moved toward the front when said telephoto lens is combined with said attachment lens.

5. A combination lens system comprising:
a telephotographic objective lens including a front lens group having a positive focal length, a rear lens group positioned axially closer to an image side than said front lens group, said rear lens group including at least one sub-group movable within and beyond an ordinary axial movement in connection with the focusing of said objective lens; and an attachment lens including a plurality of lens elements and being removably situated on the image side of said telephotographic objective lens in axial alignment;

wherein said sub-group is moved outside its ordinary movement range when said attachment lens is attached to the image side of said telephotographic objective lens;

wherein the movement range of said sub-group includes a second movement range for the focusing of a system formed by attaching said telephotographic lens to said attachment lens and the ordinary movement range;

wherein said attachment lens group has a negative synthetic focal length, and the position which said sub-group takes within the ordinary movement range when said telephotographic objective lens is focused at infinity is adjacent to the position which the sub-group takes within the second movement range when the system formed by attaching said attachment lens to said telephotographic objective lens is focused on a near object; and wherein said sub-group has a front lens surface of forward convexity, and said attachment lens includes a negative meniscus lens, a biconvex lens, a biconcave lens, and, after a small space from said biconcave lens, a biconvex lens and a biconcave lens.

6. A combination lens system comprising:

a basic lens system having
- a lens barrel;
- mounting means for mounting said lens barrel on a camera body;
- at least one fixed sub-group to be fixed to said lens barrel;
- at least one movable sub-group which moves to expand the distance between a focal point (F) of said basic lens system and said fixed sub-group; and an attachment lens system having
- a second lens barrel;
- a lens group for increasing the focal length of said basic lens system; and
- coupling means for coupling said second lens barrel to said mounting means.

7. A combination lens system according to claim 6, wherein said basic lens system comprises a front group having a positive focal length and a rear group axially apart from said front group and having a negative focal length, said rear group including a movable sub-group which moves beyond a focusing range of said basic lens system.

* * * * *